May 6, 1941.  C. W. YELM ET AL  2,240,735
ROUND BELT
Filed Feb. 24, 1940
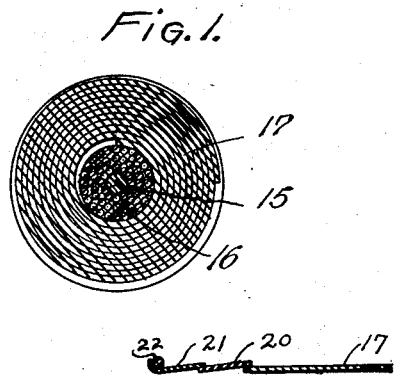
Fig. 1.
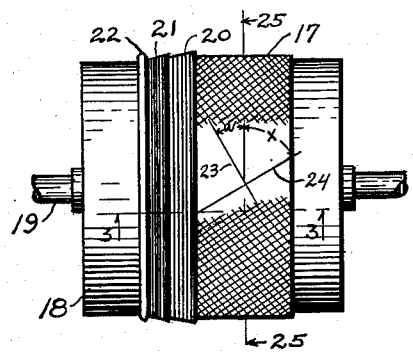
Fig. 2
Fig. 3
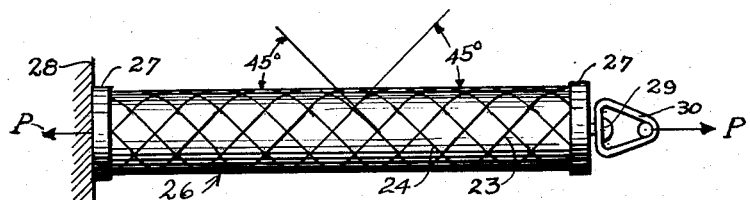
Fig. 4
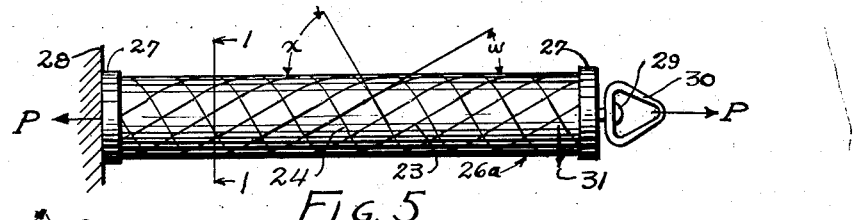
Fig. 5
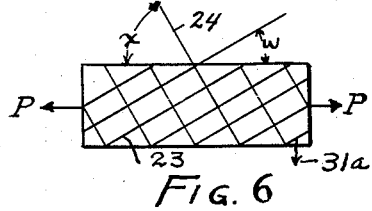
Fig. 6
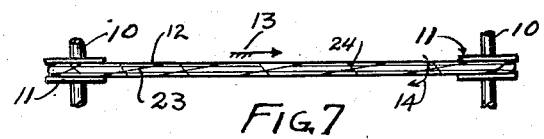
Fig. 7
Fig. 8
CHARLES W. YELM
ANTONE F. REZNICEK
INVENTORS
BY Martin E. Anderson
ATTORNEY.

Patented May 6, 1941

2,240,735

UNITED STATES PATENT OFFICE 2,240,735

ROUND BELT

Charles W. Yelm and Antone F. Reznicek, Denver, Colo., assignors to The Gates Rubber Company, Denver, Colo., a corporation of Colorado Application February 24, 1940, Serial No. 320,568

11 Claims. (Cl. 74—238)

This invention relates to improvements in round belts of the type constructed from rubberized cord and rubberized woven fabric.

It is quite common to construct endless belts having a core of substantially inextensible cords enclosed in a covering of bias cut rubberized fabric. In such belts the fabric is invariably cut on a forty-five degree bias. Such belts operate very nicely in pulleys having V-shaped grooves and after they have been in operation for a comparatively short time the sides flatten where the belts come into contact with the sides of the grooves. The deformation is caused by the repeated pressure applied to the same portions of the belt surface by the sides of the pulley grooves. Such belts wear unequally because the wear is not distributed over the surface.

It has been found that a round belt will wear longer if it is slowly rotated about its axis during operation because the outer surface will then wear equally at all points, the belt will retain its circular cross sections, and the strains due to the constant flexing of the belt in its travel about the pulleys will be distributed to all parts of the belt.

It is the object of this invention to produce an endless round belt of such construction that the forces transmitted by the belt will produce in the belt itself torsional forces which cause the belt to turn automatically about its axis during operation.

The above object is attained by the simple expedient of so positioning the rubberized fabric that the warp and the woof will make unequal angles with the axis of the belt thereby setting up unequal torsional strains when the belts are subjected to tension, as distinguished from the ordinary belts in which the covering strips of rubberized woven fabric are so positioned that the warp and woof make equal angles with the longitudinal elements of the belt.

Having thus explained the objects of the invention and briefly described the same, the invention will now be described in detail, and for this purpose reference will be had to the accompanying drawing in which the invention has been illustrated and in which—

Figure 1 is a transverse section showing a belt of the type to which this invention relates.

Figure 2 is a view showing the manner in which the material is assembled on a drum.

Figure 3 is a section taken on line 3—3 of Fig. 2.

Figure 4 is a diagrammatic representation of a round belt having rubberized fabric covering cut on a forty-five degree bias.

Figure 5 is a view similar to that shown in Fig. 4 and shows a covering cut on a bias less than forty-five degrees.

Figure 6 is a diagram showing the distorting forces developed in a woven fabric in which the warp and the woof make different angles with the direction of the force.

Figure 7 is a top plan view of a belt showing the same in place on spaced pulleys, the direction of the warp and woof being designated by lines angularly related to the axis of the belt; and Figure 8 is a cross section of a belt, constructed as shown in Fig. 4, and shows the flattened sides of the belt.

In Fig. 7 of the drawing, reference numeral 10 designates the axles about which pulleys 11 rotate and reference numeral 12 designates an endless round belt which is applied to the pulleys.

The arrow 13 indicates the direction in which the belt moves while arrow 14 indicates the direction of the maximum torsional strain.

In Figure 1, reference numeral 15 indicates a heavy cotton cord that is surrounded by one or more layers 16 of rubberized cord. Wound spirally about the core thus formed is a strip 17 of woven rubberized fabric. This strip is cut on a bias in such a manner that the angle between the longitudinal axis of the strip and the warp and woof are unequal as will be hereafter more fully explained.

The belt is constructed in the manner illustrated in Figs. 2 and 3 in which reference numeral 18 designates a cylindrical drum mounted for rotation on an axle 19. The diameter of the drum is determined by the size of the belt to be made thereon. A strip of woven rubberized fabric 17, cut on the bias, is wound around the drum in the manner shown. Along one edge of fabric 17 and slightly overlapping the same is a narrow strip 20 of rubberized cord fabric and overlapping this is another strip 21 of similar rubberized cord fabric. The cords in strip 21 are preferably somewhat finer than those in strip 20.

Wound around the edge of strip 21 is a cotton cord 22. When the elements just explained have been applied to the drum the operator starts rolling the cord 22 towards the right, when viewed as in Fig. 3, until the whole assembly is formed into a round endless belt whose cross section is shown in Fig. 1.

The method just described is one quite extensively employed in the manufacture of round endless belts and no novelty is claimed for the method.

It has been explained above that the effects sought by this invention are due to the specific relation between the directions of the warp and woof in the woven fabric strip 17 and the axis of the belt.

In Fig. 2 the warp has been designated by lines 23 and the woof by lines 24 which extend at right angles to line 23. The longitudinal axis of strip 17 has been indicated by line 25—25. The angle between the axis of the strip and the warp 23 has been designated by $w$ and the corresponding angle between the axis 25—25 and the woof has been designated by reference connection $x$. It will be seen that the angle $w$ is smaller than angle $x$, whereas in the ordinary belts the strip corresponding to strip 17 is so cut that the axis 25—25 makes an angle of 45 degrees with both the warp and the woof.

Referring now to Fig. 4, reference numeral 26 designates a short section of round belt while reference numerals 23 and 24 indicate respectively threads in the warp and the woof of the strip. In this embodiment the warp and woof both make an angle of 45 degrees with a diametrical plane of the belt and consequently if the belt is subjected to a tension, indicated by reference character P, there will be no tendency for the belt to turn about its axis since the warp and woof both exert equal amounts of torsional strains and since these forces or strains act in opposite directions they neutralize each other.

In Fig. 5 a belt 26a has been shown which is similar to that shown in Fig. 4, with the exception that the angle between the warp 23 and the axis of the belt, which angle has been designated by $w$, is less than the corresponding angle between the woof 24 and the axis of the belt. The latter angle has been designated by reference character $x$.

In Fig. 5 the ends of the belt have been shown as secured in caps 27. The cap at the left end is presumed to be attached to a stationary member 28 so that it cannot rotate. The cap 27 at the right has been shown as provided with a headed pivot pin 29 that passes through a suitable opening in link 30 in such a way that relative rotation can take place. It is presumed that a force P is applied to link 30 whereby the belt is subjected to tension. When the belt is put under tension the tendency is for the helically extending warp threads 23 to straighten. Since the pitch of the warp is greater than the pitch of the woof the torsional force exerted by the warp will exceed the corresponding force exerted by the woof and as the result the belt will twist downwardly on the near side, as indicated by the arrow 31.

In Fig. 6, a diagram has been shown which will show the deforming action of a tensional force applied to a strip of woven fabric cut on a bias in such a way that the angle between the warp 23 and the direction of the tensioning force is smaller than the angle between the woof 24 and the direction of the tensioning force. When such a strip of fabric is subjected to a force tending to stretch it, the lower right-hand corner will move downwardly, as indicated by arrow 31a. If such a strip covers a round belt it is evident that the belt will tend to turn about its axis when it is exerting a force as it does when transmitting power.

Referring now to Fig. 7 in which a belt constructed in the manner described has been applied to two spaced pulleys 11, it will be evident that when the belt is under tension the unequal torsional force above referred to will twist the belt slightly. As the belt is moving towards the right, when viewed as in Fig. 7, the slight twisting produced by the unequal torsional strains will continue as long as the belt is operating, with the result that the belt will slowly turn about its axis thereby distributing the wear uniformly over the entire outer surface.

When a belt is constructed in the usual way with the warp and woof making equal angles with the axis of the belt there is no tendency for the belt to twist and to rotate, and after it has been in operation for a comparatively short time the sides that contact with the sides of the grooves in the pulleys will become flattened, as indicated by reference numeral 32 in Fig. 8. In such a belt the unequal stretching between the inner and outer surface of the belt will always be borne by the same parts of the belt and as a result the belt will fail quicker than if it were rotating about its axis during the operation.

A belt constructed in the manner above described will continue to be of circular shape and the strains will be distributed uniformly over the material of the belt.

In the example illustrated the outer covering, which has been designated by reference numeral 17, has been shown as formed from woven rubberized fabric and it is believed that this is the most desirable material to be employed. It is possible to obtain the same turning effect by employing strips of cord fabric wound helically and in opposite directions adjacent layers being wound at a different pitch.

It is also possible to obtain unequal torsional force in a belt constructed as shown in Fig. 4 by twisting the belt before it is vulcanized whereby the equilibrium of force between the warp and the woof will be disturbed; such a belt, however, will not continue to rotate in the same direction but will oscillate through a comparatively small angle.

Although the belt has been shown as provided with a cord core this is not an essential element for the purpose of obtaining the rotary action above described.

In the above description the warp 23 has been described as making the smaller angle with the axis of the belt but it is to be understood that it is immaterial whether the worp or the woof make the smaller angle, the important distinction being that they make unequal angles.

It is, of course, well understood by persons versed in the art of transmitting power by means of belts that the force transmitted must never exceed the elastic limit of the belt. According to Kent, page 886, fifth edition, the working strain on the driving side is generally taken as from one-eighth to one-sixteenth of the strength of the solid belt. A belt working under normal conditions is never strained beyond the elastic limit of the material and therefore the cords comprising the core, the weft and the woof always possess some residual elasticity.

Having described the invention, what is claimed as new is:

1. An endless, self-turning, round belt having a central core of cords and a covering of bias cut fabric, the belt body having incorporated therein two groups of oppositely wound helically extending tension members, one group having a different pitch than the other whereby a resultant torque is produced which tends to twist the belt in one direction when it is subjected to a stretching force.

2. An endless, self-turning, round belt having a central cord core surrounded by rubberized fabric, the body having incorporated therein an unbalanced assembly of oppositely wound groups of helically extending tension members which tend to straighten when the belt is subjected to an extending force thereby producing unequal oppositely acting torques whose resultant tends to twist the belt in one direction and causes it to rotate about its axis during operation.

3. An endless, self-turning, round belt having a central cord core surrounded by rubberized fabric, the body having incorporated therein at least two sets of oppositely wound helically extending tension members, the members of each set having different pitch angles whereby opposed torque forces are produced when the belt is subjected to tension, the resultant of said torque forces tending to twist the belt about its axis and cause it to rotate during operation.

4. An endless, self-turning, round belt having a core surrounded by a rubber containing body and an outer cover of bias cut fabric, means for producing a twisting force in the belt while it is operating, said means comprising at least two sets of oppositely wound, helically extending cords having different pitch angles and which tend to straighten when the belt is tensioned whereby a resultant torque is produced which twists the belt through a small angle, whereby the belt will rotate when operating.

5. An endless, self-turning, round belt having a wall formed from at least two groups of threads extending helically about its axis, the groups extending in opposite directions, the threads that extend in one direction having a greater pitch than those that extend in the other direction, whereby unequal torsional strains will be set up when the belt is subjected to tension.

6. An endless, self-turning, round belt having an outer wall comprising at least two groups of rubberized threads wound helically, one group of threads extending in one direction and the other in the opposite direction, the threads of each group being parallel and the threads of the two groups being wound at different pitch angles, whereby unequal torsional strains will be set up in the belt when it is subjected to tension.

7. An endless, self-turning, round belt having an outer layer of rubberized woven fabric in which the warp and the woof make different angles with respect to a diametrical plane of the belt, whereby unequal torsional forces will be set up in the belt when it is subjected to tension.

8. An endless, self-turning, round belt having a central core of longitudinally extending cords surrounded by a spirally wound layer of bias cut rubberized woven fabric in which the warp and the woof extend helically around the belt and are inclined at different angles to the longitudinal elements of the belt, whereby unequal torsional forces will be developed when the belt is subjected to tension.

9. An endless, self-turning, round belt having an outer wall formed from bias cut rubberized woven fabric wound spirally, the warp and the woof extending helically and at different angles to a diametrical plane of the belt, whereby unequal torsional forces will be produced in the belt when it is subjected to tension.

10. An endless, self-turning, round belt having a core of substantially parallel cords, and a covering formed from at least two groups of parallel rubberized threads extending helically around the core, the threads of the groups extending in opposite directions, and at different pitch angles, whereby unequal torsional strains will be produced in the belt when it is subject to strain.

11. An endless, self-turning, round belt having a core of longitudinally extending parallel cords, and an outer wall formed from rubberized woven fabric rolled spirally about the core, the fabric being formed into strips, the axis of the strip making unequal angles with the warp and the woof, whereby unequal torsional forces will be produced in the belt when it is subjected to tension.

CHARLES W. YELM.
ANTONE F. REZNICEK.